United States Patent
Boerkel

(10) Patent No.: US 7,520,125 B2
(45) Date of Patent: Apr. 21, 2009

(54) METHOD FOR CONTROLLING THE AMOUNT OF SECONDARY AIR

(75) Inventor: Wolfgang Boerkel, Benningen (DE)

(73) Assignee: Robert Bosch GmbH, Stuttgart (DE)

( * ) Notice: Subject to any disclaimer, the term of this patent is extended or adjusted under 35 U.S.C. 154(b) by 391 days.

(21) Appl. No.: 10/494,497

(22) PCT Filed: Jul. 23, 2002

(86) PCT No.: PCT/DE02/02697

§ 371 (c)(1),
(2), (4) Date: Oct. 26, 2004

(87) PCT Pub. No.: WO03/040528

PCT Pub. Date: May 15, 2003

(65) Prior Publication Data

US 2005/0039445 A1    Feb. 24, 2005

(30) Foreign Application Priority Data

Nov. 2, 2001    (DE) .................... 101 54 081

(51) Int. Cl.
*F01N 3/00* (2006.01)

(52) U.S. Cl. .............. 60/289; 60/284; 60/293; 60/300

(58) Field of Classification Search .......... 60/274, 60/284, 285, 289, 290, 293, 300
See application file for complete search history.

(56) References Cited

U.S. PATENT DOCUMENTS

| | | | | |
|---|---|---|---|---|
| 5,388,402 A | * | 2/1995 | Aoki et al. | 60/276 |
| 5,459,999 A | * | 10/1995 | Hosoya et al. | 60/284 |
| 5,617,720 A | * | 4/1997 | Achleitner et al. | 60/274 |
| 5,666,804 A | * | 9/1997 | Sekiya et al. | 60/284 |
| 5,675,968 A | * | 10/1997 | Katashiba et al. | 60/276 |
| 5,724,810 A | | 3/1998 | Hosoya et al. | |
| 5,765,368 A | * | 6/1998 | Matsumoto et al. | 60/274 |
| 5,894,724 A | * | 4/1999 | Minowa et al. | 60/274 |
| 5,950,419 A | * | 9/1999 | Nishimura et al. | 60/274 |
| 6,041,593 A | * | 3/2000 | Karlsson et al. | 60/284 |
| 6,085,517 A | * | 7/2000 | Bayerle et al. | 60/274 |
| 6,145,302 A | * | 11/2000 | Zhang et al. | 60/274 |
| 6,155,043 A | * | 12/2000 | Zhang et al. | 60/284 |
| 6,463,732 B2 | * | 10/2002 | Baeuerle et al. | 60/274 |

FOREIGN PATENT DOCUMENTS

| | | |
|---|---|---|
| DE | 43 25 202 | 3/1994 |
| DE | 198 29 205 | 8/1999 |
| EP | 0 558 320 | 9/1993 |
| JP | 4365917 | 12/1992 |
| JP | 559940 | 3/1993 |
| JP | 05 106 431 | 8/1993 |
| JP | 11148341 | 6/1999 |
| JP | 2000 145432 | 5/2000 |

* cited by examiner

*Primary Examiner*—Thomas E Denion
*Assistant Examiner*—Diem Tran
(74) *Attorney, Agent, or Firm*—Kenyon & Kenyon LLP

(57) ABSTRACT

A method for controlling the amount of secondary air of a motor vehicle, which has a device for injecting secondary air. The increase in the injected amount of secondary air is carried out as a function of the starting conditions of the motor vehicle and the heating progression of the catalytic converter determined by modeling and/or measurement, and is variable over time.

8 Claims, 2 Drawing Sheets

METHOD FOR CONTROLLING THE AMOUNT OF SECONDARY AIR

FIELD OF THE INVENTION

The present invention relates to method for controlling the amount of secondary air of a motor vehicle that has a device for injecting secondary air.

BACKGROUND INFORMATION

The injection of additional air directly after the combustion chamber results in the afterburning of the hot exhaust gas. On one hand, this "exothermic reaction" reduces the amount of the exhaust-gas components, hydrocarbons (HC) and carbon monoxide (CO), and, on the other hand, heats the catalytic converter.

By this means, the conversion rate in the warm-up phase of the catalytic converter is considerably increased, which is particularly necessary for vehicles having very low emissions.

In conventional methods, the secondary air is switched in in an abrupt manner.

In addition, secondary-air injection systems of the applicant are known, in which controllable secondary-air pumps are used whose air mass flow rates are separately measured. The mass of air is then preferably notched up, using a ramp whose slope is appliable, but constant. In conventional secondary-air injection systems and methods for controlling the amount of secondary air, it is problematic that the amount of secondary air is not adaptable to the heating progression in the catalytic converter. This results in a conversion rate, which is not optimal and can lead, in extreme cases, to pollutants such as hydrocarbons (HC) ending up in the exhaust gas (so-called hydrocarbon (HC) breakthroughs).

SUMMARY

Therefore, an object of the present invention is to further develop a generic method for controlling the amount of secondary air, so that the injection of secondary air allows the heating of the catalytic converter to be optimized, and thus allows a better (higher) conversion rate to be attained in the warm-up phase than in the case of known secondary-air injection systems. On one hand, this may allow pollutant emissions, in particular hydrocarbon (HC) breakthroughs, to be prevented, and on the other hand, the heating of the catalytic converter should be optimized, i.e., accelerated.

In accordance with an example embodiment of the present invention, a method for controlling the amount of secondary air of a motor vehicle is provided, in which an increase in the amount of injected secondary air is carried out as a function of the starting conditions and of the heating curve of the catalytic converter determined by modeling and/or measurement, and is variable over time. This allows the catalytic converter to be heated in an optimum manner. As a result, the limiting values of the pollutants in the exhaust gas are reliably achieved. In particular, additional heating measures, such as burners or E-catalytic converters, i.e., electrically heatable catalytic converters, may be dispensed with, or their potential may be more effectively utilized.

In this context, the start of secondary-air delivery is also advantageously selected as a function of the following starting conditions: surrounding temperature; engine temperature; catalytic-converter temperature determined by measurement or modeling; and possibly a temperature of an auxiliary catalytic converter heater, if one is present.

In this case, the increase in the amount of secondary air immediately after the start of the secondary-air delivery is selected as a function of these starting conditions.

When the heating curve of the catalytic converter, e.g. its temperature determined from the temperature model or by measurement, rapidly progresses, where the heating curve is to be understood as, e.g., the temperature of the catalytic converter, the temperature profile of the catalytic converter, the heated, catalytic-converter volume, the converting, catalytic converter volume, or the heating progression of the catalytic converter, the change in the amount of secondary air delivered over time is increased, thereby yielding a progressive curve.

However, when the heating of the catalytic converter only progresses slowly due to, e.g., unfavorable heat dissipation, the change in the amount of secondary air delivered over time is reduced or, in other words, the progression of the mass flow rate of the secondary air is set to be degressive.

In a particularly advantageous specific embodiment, the curve of the change in the amount of secondary air conveyed with respect to time is initially progressive, but then continuously changes into a degressive curve.

With regard to quality or quantity, the change in the rich mixture supplied to the internal combustion engine of the vehicle with respect to time is advantageously selected in the same manner as the change in the amount of secondary air delivered with respect to time; this means that after the secondary air is supplied, the air-fuel ratio is always kept in the range optimal for the heating. This is slightly greater than $\lambda=1$, e.g., $\lambda=1.1$, since, because of system tolerances, the air-fuel ratio may also not fall under $\lambda=1$ under any circumstances, which results in the formation of a massive amount of hydrocarbons (HC). On the other hand, too much excess air ($\lambda \gg 1$) reduces the temperature level of the exhaust gas.

BRIEF DESCRIPTION OF THE DRAWINGS

Further advantages and features of the present invention are the subject matter of the following description and the illustrative representation of exemplary embodiments.

DETAILED DESCRIPTION OF EXAMPLE EMBODIMENTS

Figure 1:
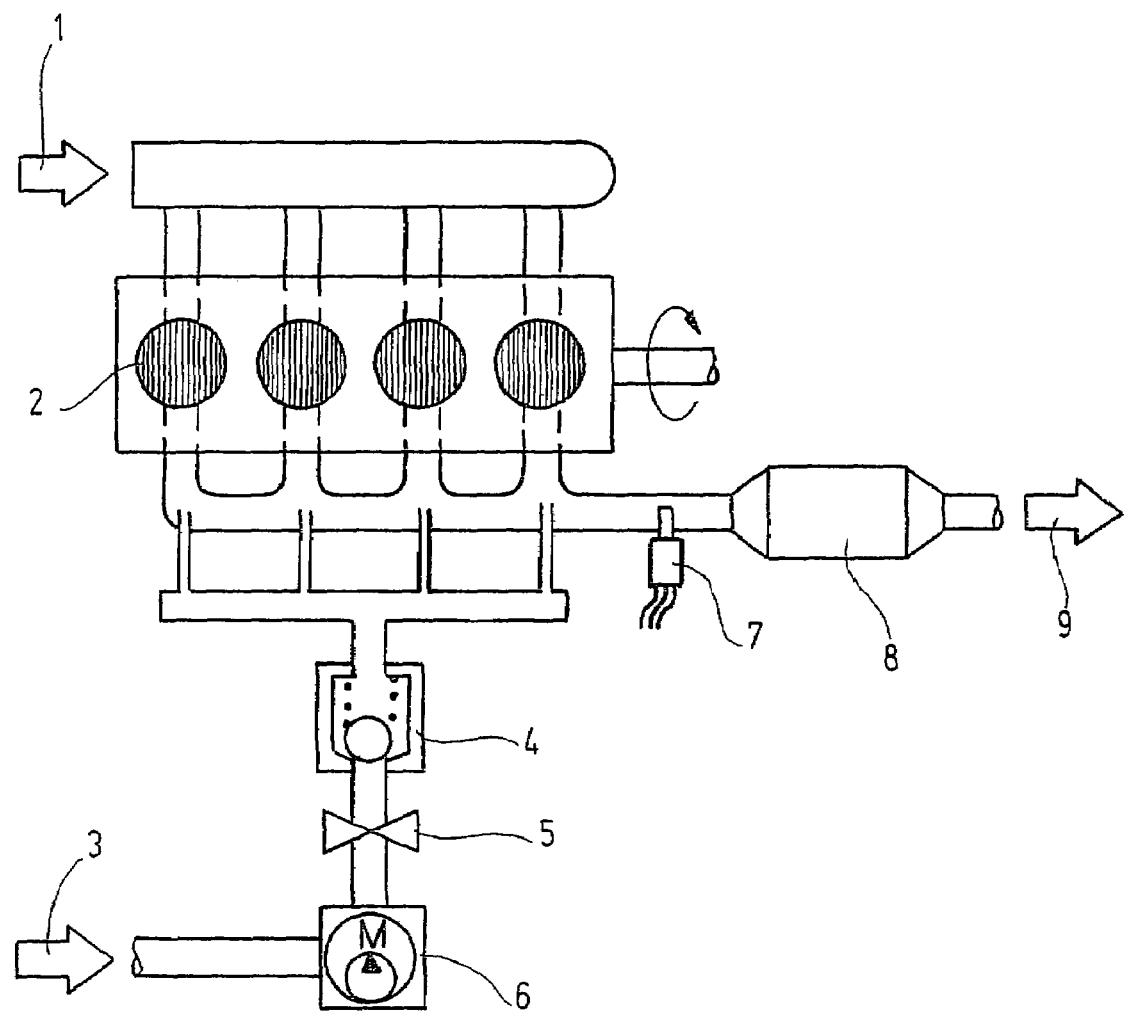
FIG. 1 shows a conventional secondary-air injection system.

An internal combustion engine 2 having a secondary-air injection system is described below in connection with FIG. 1. Internal combustion engine 2, which is supplied intake air 1, has an oxygen sensor 7 situated in the exhaust-gas duct, as well as a catalytic converter 8, which should operate at a conversion rate that is as optimal as possible, in order to prevent harmful exhaust-gas components in exhaust gas 9. Internal combustion engine 2 is supplied secondary air 3 by, e.g., an electric, secondary-air pump 6, which feeds the secondary air through a secondary-air valve 5 and a one-way valve 4, directly after the combustion chamber of internal combustion engine 2. The injection of additional air directly after the combustion chamber results in the afterburning of the hot exhaust gas. The "exothermic reaction" occurring in this context reduces, on one hand, the amount of the exhaust-gas components, hydrocarbons (HC) and carbon monoxide (CO), and heats, on the other hand, the catalytic converter. The heating of the catalytic converter considerably increases the conversion rate in the warm-up phase of the catalytic converter.

An option for rapidly bringing the catalytic converter up to operating temperature, which is particularly necessary for vehicles having very low emissions, is now, on one hand, to operate the engine using a rich mixture and, on the other hand, to inject the above-described secondary air directly after the combustion chamber.

Figure 2:
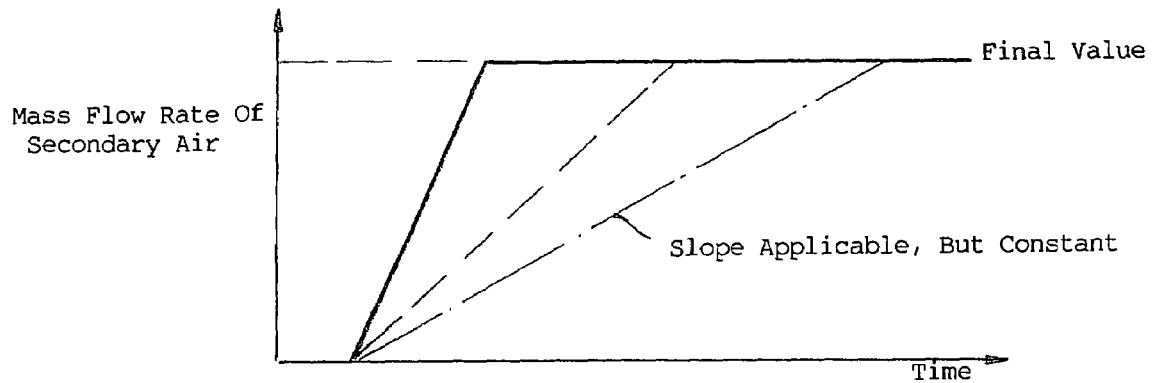
FIG. 2 shows the conventional mass flow rate of secondary air versus time.

In conventional secondary-air injection systems, the secondary air is supplied in an abrupt manner. Controllable, secondary-air pumps having their own systems for measuring the mass flow rate of air are used in more recent applications. As schematically represented in FIG. 2, the mass of air is then preferably notched up, using a ramp whose slope is appliable. However, this slope does not take the entire heating curve and the starting conditions into account in an optimum manner.

Therefore, according to the present invention, the start of the secondary-air delivery and the initial increase in the mass flow rate are designed to be variable and a function of the starting conditions, and the slope of the "ramp" for notching up the secondary-air pump is designed to be variable over time and a function of the heating progression in the catalytic converter. To this end, the start of the secondary-air delivery is selected as a function of the surrounding and starting conditions, e.g., as a function of the surrounding temperature and the starting temperature of the engine, as well as its previous history. Consideration of the previous history is understood to be the test if the engine has been restarted, in which case the catalytic converter already has a temperature different from, namely greater than, that from when the engine was first started. For this reason, the catalytic-converter temperature is acquired, e.g., using a catalytic-converter temperature model, or by measuring it. If an auxiliary heater, e.g., an electrically heatable catalytic converter or a burner or the like is present, then it's starting conditions are also monitored. Of course, further variables influencing the catalytic-converter temperature may be considered.

The increase in the amount of secondary air immediately after the start of the secondary-air delivery is also selected as a function of these starting conditions, and to be variable over time.

Accordingly, both the increase in the injected amount of secondary air and the increase in, or enrichment of, the rich air-fuel mixture supplied to the internal combustion engine are carried out as a function of the catalytic-converter temperature determined by modeling and/or measurement, or in other words, as a function of the heating progression in the catalytic converter, so as to vary with time.

By this means, the catalytic converter is heated in an optimized manner, thereby allowing the limiting values to be reliably attained.

In the case of vehicles having very low limiting values for emissions, it is particularly necessary to optimize the heating of the catalytic converter, since the catalytic converter must be at its operating temperature necessary for the conversion, prior to the beginning of the vehicle's trip. In this context, the fuel-air mixture may not be added too rapidly, however, or else the result may be so-called HC breakthroughs, i.e., hydrocarbons (HC) in the exhaust gas after the catalytic converter, and thus, the specified limiting values for the exhaust-gas components may no longer be adhered to.

In many cases, only a small part of the catalytic converter or catalytic converters initially reaches the temperature necessary for conversion, using the customary heating measures (ignition retard, early opening of the exhaust, external heating). In this case, only a small amount of rich mixture and secondary air may initially be provided, since the above-described HC breakthroughs may otherwise occur.

Figure 3:
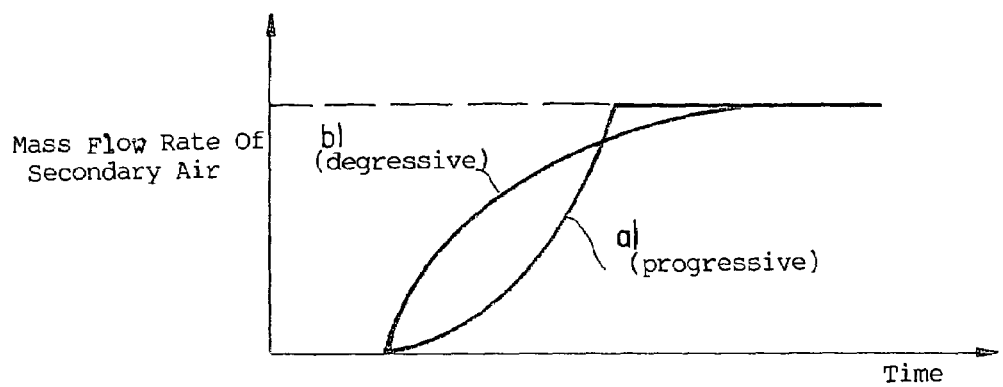
FIG. 3 show a first exemplary embodiment of the mass flow rate of secondary air versus time, according to the present invention.

The conversion of this mixture causes the temperature in the catalytic converter and also its converting volume to rapidly increase. The mass of secondary air and the rich mixture may be increased very rapidly. A progressive curve of the mass flow rate of the secondary air, as shown in FIG. 3, part (a), is possible. In this manner, the catalytic converter/catalytic converters is/are more rapidly heated, so that reliable conversion is possible when driving off, and this allows additional heating measures, such as an E-catalytic converter and a burner, to be dispensed with.

Shown in FIG. 3, part (b) is the mass flow rate of the secondary air versus time in a vehicle, where, in spite of converted chemical energy, i.e. the provision of a rich mixture and secondary air, the catalytic converter does not heat up as desired, due to, e.g. high heat losses to the environment. In this case, the secondary air and also the rich mixture are only notched up in a degressive manner, i.e. the increase in the amount of secondary air delivered is reduced over time. This degressive characteristic prevents HC breakthroughs, which means that the entire system becomes more robust with respect to external influences. This likewise renders fewer additional heating measures necessary, which also carry the risk of HC breakthroughs.

Figure 4:
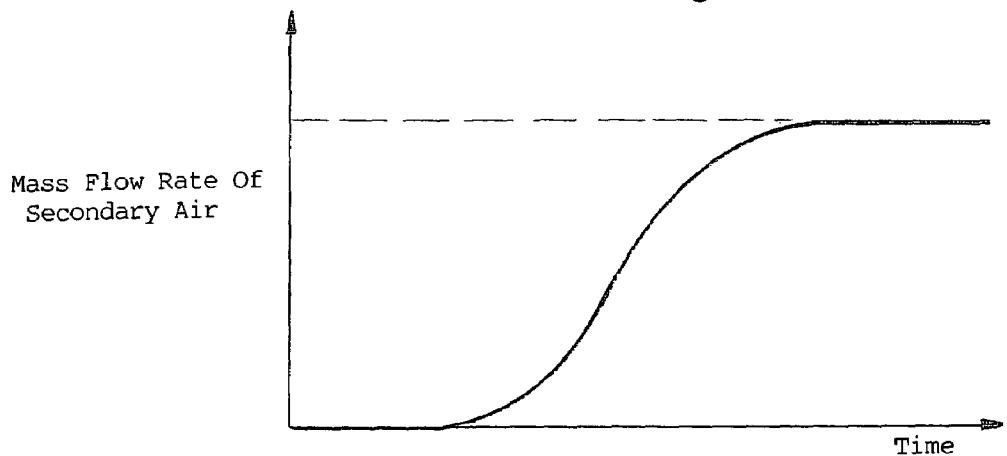
FIG. 4 shows a further exemplary embodiment of the mass flow rate of secondary air versus time, according to the present invention.

In most cases, a combination of the curves of the mass flow rate of secondary air versus time in FIG. 3 is necessary, which is explained below in connection with FIG. 4. The temporal change in the amount of secondary air delivered and the rich mixture is initially carried out in a progressive manner, and then changes into a degressive curve. In the case in which the slope of the "ramp" is variable, any arbitrary combination of the above-described options, i.e. any curve of the mass flow rate of the secondary air, is, of course, possible. The start of the heating measures and the initial slope of the mass flow rate of the secondary air are a function of the above-described boundary conditions, i.e. in particular also a function of whether the vehicle is being started or restarted.

What is claimed is:

1. A method for controlling an amount of secondary air of a motor vehicle which has a device for injecting the secondary air, the method comprising:

increasing an amount of injected secondary air as a function of starting conditions of the motor vehicle, the amount of injected secondary air being variable over time; and adapting a change in the amount of secondary air delivered over time, to one of a modeled heating curve of a catalytic converter or measured heating curve of the catalytic converter, the amount of secondary air being notched up as a function of a heating of the catalytic converter.

2. The method as recited in claim 1, wherein the amount of secondary air is at least one of progressively and degressively notched up as a function of the heating of the catalytic converter.

3. The method as recited in claim 1, wherein a curve of the change in the amount of secondary air delivered over time is initially progressive and then continuously changes into a degressive curve of the change in the amount of secondary air delivered over time.

4. The method as recited in claim 1, wherein a rich mixture supplied to the internal combustion engine of the vehicle is changed over time in a same manner as the amount of secondary air delivered is changed over time.

5. The method of claim 1, wherein the amount of secondary air, while it is being notched up, varies in accordance with a heating progression of the catalytic converter.

6. The method as recited in claim 1, wherein a start of secondary-air delivery is selected as a function of at least one of the following starting conditions: surrounding temperature, engine temperature, and catalytic-converter temperature determined by measurement or modeling.

7. The method as recited in claim 6, wherein an increase in the amount of secondary air immediately after the start of the secondary-air delivery is selected as a function of the starting conditions and vary over time.

8. A method for controlling an amount of secondary air of a motor vehicle which has a device for injecting the secondary air, the method comprising:

increasing an amount of injected secondary air as a function of starting conditions of the motor vehicle, wherein, during a phase of injection of secondary air, the amount of injected secondary air is variable over time; and adapting a rate of a change of a flow rate of secondary air to one of a modeled heating curve of a catalytic converter and a measured heating curve of the catalytic converter, the amount of secondary air being notched up as a function of a heating of the catalytic converter.

* * * * *